UNITED STATES PATENT OFFICE.

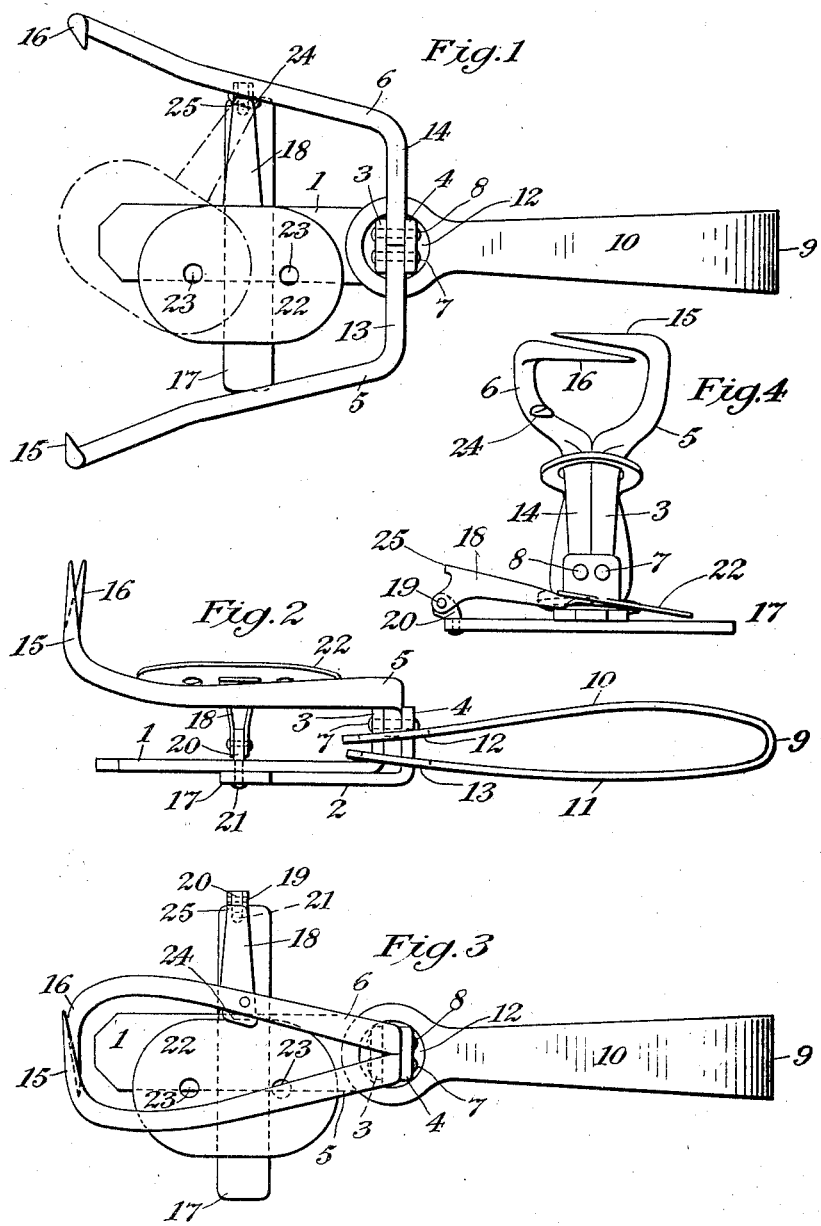

WINFIELD A. WELLS, OF SPENCER, NEW YORK.

ANIMAL-TRAP.

1,382,153.

Specification of Letters Patent. Patented June 21, 1921.

Application filed June 3, 1920. Serial No. 386,173.

*To all whom it may concern:*

Be it known that I, WINFIELD A. WELLS, a citizen of the United States, residing at Spencer, Tioga county, New York, have invented certain new and useful Improvements in Animal-Traps, of which the following is a specification.

My invention relates to that class of animal traps which consist essentially of a pair of hinged jaws adapted to be held apart by a depressible latch, and to be closed by the action of an expansible spring when the latch is tripped. And my improvements are directed particularly to means for increasing the efficiency and certainty of operation of the jaw arms, and for securing adjustability of the bait pan to different operative positions relative to the jaw arms, and also to other details of construction which are pointed out and claimed.

In the drawings Figure 1, is a plan view of a trap embodying my improvements, the jaw arms being open and held apart by the trip latch; Fig. 2, is a side view of the same looking up on Fig. 1; Fig. 3, is a plan view of the trap with its jaw arms closed; and Fig. 4, is an end view looking to the right on Fig 3.

The same parts are designated by the same reference numerals in all the figures.

The base of the trap is preferably formed of two angle irons 1 and 2, provided, respectively, with upturned flanges 3 and 4, between which the jaw arms 5 and 6, are secured by suitable pivots as 7 and 8.

A spring 9 is formed in a loop with two arms 10 and 11 provided with apertures 12 and 13 in their respective ends through which are passed the flanges 3 and 4, of the plates 1 and 2, the arm 10, when the jaws 5 and 6 close, passing up around their shanks 13 and 14, so as to lock them securely together. The jaw arms 5 and 6 are curved outwardly and then inwardly and terminate in sharp points or prongs 15 and 16, which, when the trap is opened, as in Figs. 1 and 2, project upwardly; and when the trap is sprung and closed, as in Figs. 3 and 4, overlap in close proximity to each other, so as to effectually hold anything which may be impaled thereupon.

A cross base-member 17, is disposed transversely of the base plates 1 and 2, so as to give lateral support to the trap, and also to afford a support for the trip latch 18, one end of which is pivoted at 19, to a swivel head 20, pivoted to the cross base 17, at 21. The opposite end of the trip latch 18, carries a suitable bait pan 22, which may be provided with any desirable means, as for instance perforations 23, for facilitating the attachment of bait thereto. The jaw arm 6, is provided with a suitable latch detent 24, which is adapted to lock beneath the heel of the trip latch 18, as shown in Fig. 1, the relative positions of the detent 24, and the swivel head 20 permitting a locking engagement to be made between the heel of the trip latch 18 and the detent, both when the bait pan and latch are adjusted centrally of the trap, as shown by the solid lines in Fig. 1, and also when the trip latch and bait pan are swung to one side, on their pivot, as indicated by the broken line Fig. 1, it being understood that this deflection of the trip latch and bait pan may be made to either side from a central position, as may be found desirable. This adjustability of the bait pan and latch permits the trap to be set so that the position of the part of the animal, as its head or foot, which may come in contact with and spring the trap, may be considered when the trap is set, and the bait pan so positioned as to greatly increase the probability of the impalement of the animal upon the closing jaw arms. Thus, if, for instance, the trap is so placed, that an animal must approach it, as from the left, on Fig. 1, and would place its head, if nosing the bait pan, between the prongs 15 and 16, it will be seen that if the trap is sprung the prongs would be in a position to impale the head of the animal before it could be withdrawn from between them. Such impalement would probably quickly kill the animal, thereby terminating its sufferings, and preventing the risk of its damaging its pelt in its struggles, or possibly tearing itself free from the trap.

By these means I secure an animal trap which is simple and strong, and, also is very efficient and positive in its operation, and the bait pan of which is also adapted to be adjusted to various positions, which may be deemed most desirable, in the different circumstances under which the trap may be used from time to time.

I desire it to be understood that the details of my construction may be varied, as by the use of mechanical equivalents, without departing from the spirit of my invention, as described and claimed.

Having thus described my invention, what I claim and desire to secure by Letters Patent of the United States is:—

1. The combination, in an animal trap, of a base, a pair of coöperating jaw arms, each pivoted at one end to the base, and each provided at its other end with a deflected terminal prong, the prongs being adapted to overlap each other when the jaw arms are closed, tripping means, embodying a swiveled and laterally adjustable latch, for holding the jaw arms separated, and spring means for closing the same.

2. The combination, in an animal trap, of a base, a pair of coöperating jaw arms, each pivoted at one end to the base and embodying a shank, an offset portion disposed substantially at right angles to the shank, and a terminal prong disposed approximately at a right angle to the offset portion and transversely of the length of the shank, the prongs being adapted to overlap each other when the jaw arms are closed but without the offset portions of the arms meeting, one of the said arms being provided with a latch detent, tripping means for holding the jaw arms separated, and a spring means for closing the same.

3. The combination, in an animal trap, of a base, a pair of coöperating jaw arms, each pivoted at one end to the base, and each provided at its other end with a deflected terminal prong, the prongs being adapted to overlap each other when the jaw arms are closed, one of the said arms being provided with a latch detent, tripping means, embodying a swiveled and laterally adjustable latch, for holding the jaw arms separated, and spring means for closing the same.

WINFIELD A. WELLS.